US011411653B2

(12) United States Patent
Lozsef et al.

(10) Patent No.: US 11,411,653 B2
(45) Date of Patent: Aug. 9, 2022

(54) OPTICAL TRANSMITTER INPUT RESISTANCE MEASUREMENT AND ENCODER/DRIVER MODULATION CURRENT CONFIGURATION TECHNIQUES

(71) Applicant: MACOM Technology Solutions Holdings, Inc., Lowell, MA (US)

(72) Inventors: Eric Lozsef, Toronto (CA); George L. Barrier, IV, Aliso-Viejo, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 17/124,430

(22) Filed: Dec. 16, 2020

(65) Prior Publication Data

US 2022/0190926 A1 Jun. 16, 2022

(51) Int. Cl.
*H04B 10/524* (2013.01)
*H04B 10/58* (2013.01)
*H04B 10/079* (2013.01)
*H04B 10/50* (2013.01)

(52) U.S. Cl.
CPC ....... *H04B 10/524* (2013.01); *H04B 10/0799* (2013.01); *H04B 10/07955* (2013.01); *H04B 10/503* (2013.01); *H04B 10/58* (2013.01)

(58) Field of Classification Search
None
See application file for complete search history.

(56) References Cited

U.S. PATENT DOCUMENTS

| | | | | |
|---|---|---|---|---|
| 6,823,145 B1* | 11/2004 | Shirai | .................. | H04B 10/505 359/254 |
| 8,036,254 B2* | 10/2011 | Ishibashi | .............. | G11B 7/1263 372/38.1 |
| 2005/0069002 A1* | 3/2005 | Senga | .................... | G11B 7/126 372/32 |
| 2010/0142336 A1* | 6/2010 | Ishibashi | .............. | G11B 7/1263 372/38.07 |
| 2010/0157770 A1* | 6/2010 | Watanabe | .............. | G11B 7/126 |

(Continued)

OTHER PUBLICATIONS

Wikipedia, Vertical-cavity surface-emitting laser, 2017 (Year: 2017).*

*Primary Examiner* — Jai M Lee

(57) ABSTRACT

Techniques for automatically determining an input resistance of an optical modulator and configuring a modulation current source can include applying a first bias current to an input of the optical transmitter and measuring a corresponding first voltage at the input of the optical transmitter. A second bias current can also be applied to the input of the optical transmitter and a corresponding second voltage at the input of the optical transmitter can be measured. An input resistance of the specific optical transmitter can be determined from the difference between the first and second voltages divided by the difference between the first and second bias currents. The technique can further include setting one or more configuration settings in one or more registers of a modulation current source based on the determined input resistance of the optical transmitter. Thereafter, the output modulation current for driving the specific optical transmitter can be configured based on the one or more configuration settings in the one or more registers.

16 Claims, 7 Drawing Sheets

(56) References Cited

U.S. PATENT DOCUMENTS

2011/0051764 A1\* 3/2011 Kamatani ............... H01S 5/042
372/38.04
2016/0242258 A1\* 8/2016 Agarwal ............ H05B 45/3725
2016/0242285 A1\* 8/2016 Katsuno ................ H05K 3/007

\* cited by examiner

OPTICAL TRANSMITTER INPUT RESISTANCE MEASUREMENT AND ENCODER/DRIVER MODULATION CURRENT CONFIGURATION TECHNIQUES

BACKGROUND OF THE INVENTION

Transmitter circuits are utilized to transmit data in a number of applications. Referring to FIG. 1, an exemplary transmitter circuit, according to the conventional art, is illustrated. The transmitter circuit 100 can include an encoder/driver 110 coupled to an optical transmitter 120. The encoder/driver 110 can be configured to convert three signals at its inputs (In0-In2) into a pulse amplitude modulated electrical signal at its output (Out). In one implementation, the encoder/driver 110 can be a "PAM-4" encoder/driver 110 that utilizes four amplitude levels of pulse modulation. In one implementation, PAM-4 modulation on a 53.125 giga baud (GBaud) communication link can support about 100 giga bits per second (Gbps).

The optical transmitter 120 can be configured to convert an electrical signal at its input (In) into an optical signal at its output (Out). In one implementation, the optical transmitter 120 can be a vertical-cavity surface-emitting laser (VCSEL) transmitter 120 that can convert the pulse amplitude modulated electrical signal from the PAM-4 encoder/driver 110 into a PAM-4 modulated optical signal at its output.

A number of parameters, including the input resistance of the VCSEL transmitter 120, impact the performance of the PAM-4 encoder/driver 110 and or the VCSEL transmitter 120 when coupled together. In a conventional implementation, one or more settings in the PAM-4 encoder/driver 110 can be set to account for the input resistance of the VCSEL transmitter 120. However, the input resistance of the VCSEL transmitter 120 can be different for different power levels, can vary from manufacturer to manufacturer, can vary from unit to unit, and or the like, which can make configuring the settings of the PAM-4 encoder/driver 110 complicated. Therefore, there is a continuing need for improved transmitter circuits and methods of configuring the transmitter circuits.

SUMMARY OF THE INVENTION

The present technology may best be understood by referring to the following description and accompanying drawings that are used to illustrate embodiments of the present technology directed toward optical transmitter input resistance measurement apparatus and methods and encoder/driver modulation current configuration apparatus and methods.

In one embodiment, a driver or encoder/driver can include a bias current generator, an analog-to-digital converter and control logic. The control logic can be configured to control the bias current generator to apply a first bias current to an input of an optical transmitter and control the analog-to-digital converter to measure a corresponding first voltage at the input of the optical transmitter. The control logic can also be configured to control the bias current generator to apply a second bias current to the input of the optical transmitter and control the analog-to-digital converter to measure a corresponding second voltage at the input of the optical transmitter. The control logic can also be configured to determine an input resistance of the individual optical transmitter from a difference between the second and first voltages divided by a difference between the second and first bias currents.

The driver or encoder/driver can also include a modulation current source. The control logic can further be configured to set one or more configuration settings of the modulation current source based on the determined input resistance of the specific optical transmitter.

In another embodiment, a method of configuring a driver or encoder/driver can include applying a first bias current to an input of the optical transmitter and measuring a corresponding first voltage at the input of the optical transmitter in response to receiving a startup event. A second bias current can also be applied to the input of the optical transmitter and a corresponding second voltage can be measured at the input of the optical transmitter in response to the received startup event. An input resistance of the specific optical transmitter can be determined from the difference between the first and second voltages divided by the difference between the first and second bias currents in response to the received startup event.

In another embodiment, a method of configuring a driver or encoder/driver can include determining automatically by the encoder/driver an input resistance of an individual optical transmitter. One or more configuration settings in one or more registers of a modulation current source can automatically be set by the driver or encoder/driver based on the received input resistance of the optical transmitter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
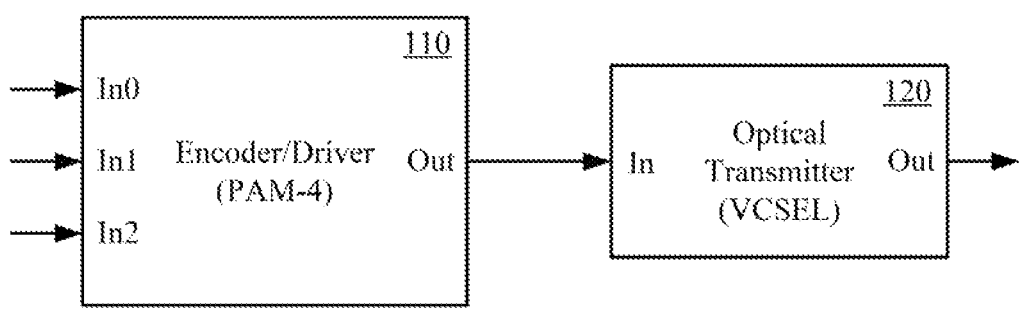
FIG. 1 shows an exemplary transmitter circuit, according to the conventional art.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications, and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared, and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 2:
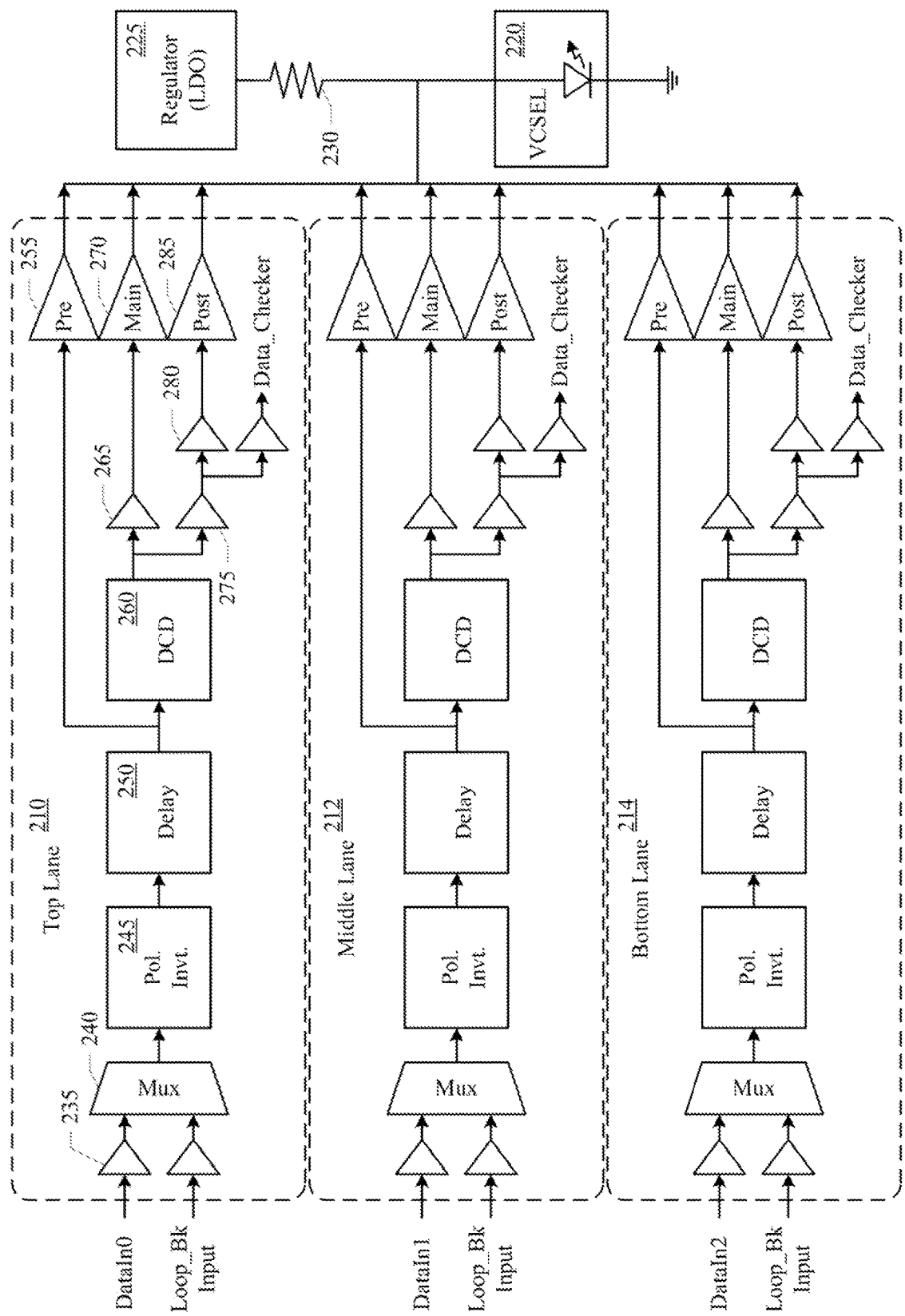
FIG. 2 shows a portion of an encoder/driver coupled to an optical transmitter, in accordance with aspects of the present technology.

Referring now to FIG. 2, a portion of an encoder/driver coupled to an optical transmitter, in accordance with aspects of the present technology, is shown. The encoder/driver can include a plurality of "lanes" of modulators. For example, a PAM-4 encoder/driver can include a "top lane" modulator 210, a "middle lane" modulator 212, and a "bottom lane" modulator 214. The circuitry of each transmit lane 210-214 can be substantially the same. Various parameters, including but not limited to, delays, drive strength, data input and or the like of the encoder/driver can vary from transmit lane to transmit lane. Current, corresponding to input data, from the plurality of transmit lanes 210-214 can be combined or summed in resistive element 230 to drive the optical transmitter 220. The optical transmitter 220 can be, but is not limited to, vertical-cavity surface emitting laser (VCSEL) transmitter 220. The VCSEL transiter 220 can generate a light signal that corresponds generally in magnitude to the currents summed by the plurality of transmit lanes 210-214.

The encoder/driver combines a plurality of streams of data, for example non-return-to-zero (NRZ) data into one linear PAM-4 stream, and in so doing the encoder/driver provides an ability to control and program bias current and modulation current, as well as provide the controls necessary to accommodate VCSEL characteristics in order to provide a clean optical eye of the modulation signal. Optical eye shaping of the modulation signal may be facilitated by per-lane programmable controls for pre and post de-emphasis. The post de-emphasis can include a polarity switch to allow both under and over equalization. Over-equalization ability is sometimes necessary when driving a VCSEL, as the characteristics of the VCSEL can be such that there is undesirable peaking on the rising data edge. In order to further help the post de-emphasis, on both rising and falling edges, a capacitor (not shown) can be placed on the emitter of a differential pair of a final output stage of each data stream. This helps to slow the rising edge of current into the VCSEL, while helping to speed up the falling edge, thereby countering some of the tendencies of the VCSEL in the electrical to optical conversion. Additional controls allow the skew between the three data streams to be programmed independently allowing further crucial eye shaping of the optical output.

A regulator 225 of the encoder/driver can be set to provide an average bias current through a resistive element 230 to the VCSEL 220. The regulator 225 can also support a transient current to generate the modulation current through the VCSEL 220. In one implementation the regulator 225 can be a low dropout (LDO) regulator. A plurality of registers can be provided in the encoder/driver to aid in setting a bias current and/or modulation current as will be further described below.

Top lane 210 can accesses a first data stream input (DataIn0). The data stream input can comprise binary, high/low data. The data stream input can be characterized as a pseudo-random bit stream (PRBS), in some embodiments. A loopback input (Loop Bk Input) can be used in a test mode to run known data through top lane 210, via data checker signal (Data_Checker), to test data integrity, in some embodiments. In a working, not-test, environment, the data stream input (DataIn0) can flow through a buffer 235 and a multiplexor 240 to a polarity inverter 245. Polarity inverter 245 can enable the data stream input (DataIn0) to be selectively inverted, if desired. A delay unit 250 can enable the data stream to be delayed, for example, by zero to about 0.25 unit interval (UI) (e.g., fraction of bit period) or more. Such a delay may be utilized to account for differing rise and fall times in a modulator, e.g., a VCSEL, according to current magnitudes, in embodiments. For example, a VCSEL may have a different rise time for a "1" bit in a top channel in comparison to a "1" bit in a bottom channel.

The output of delay unit 250 can be sent to "pre" current source 255. Pre current source 255 can provide an early current corresponding to the data stream input (DataIn0). The output of delay unit 250 can also be sent to a duty cycle distortion correction unit 260. The duty cycle distortion correction unit 260 can function to selectively correct for offsets or distortions in bit shapes in a data stream, e.g., due to process variations. In some implementations, the input to the pre current source 255 can be coupled to the output of duty cycle distortion correction block 260 rather than the output of the delay unit 250. The output of duty cycle distortion correction unit 260 can move through a delay stage 265 to a main current source 270. The main current source 270 can provide an on-time current corresponding to the data stream input (DataIn0). The output of duty cycle distortion correction unit 260 can also move through multiple delay stages 275-280 to a post current source 285. The post current source 285 can provide a late current corresponding to the data stream input (DataIn0). Similarly, the middle lane 212 can shape a middle eye optical pattern, and the bottom lane 214 can share a bottom eye optical pattern. The combination or sum of pre current source 255, main current source 270, and post current source 285 can be combined to form a desired optical wave shape for the top lane (or top "eye") 210 for output to the VCSEL 220. In some embodiments, all such current sources may be programmable. Again, the circuitry of each transmit lane 210-214 can be substantially the same.

Figure 3:
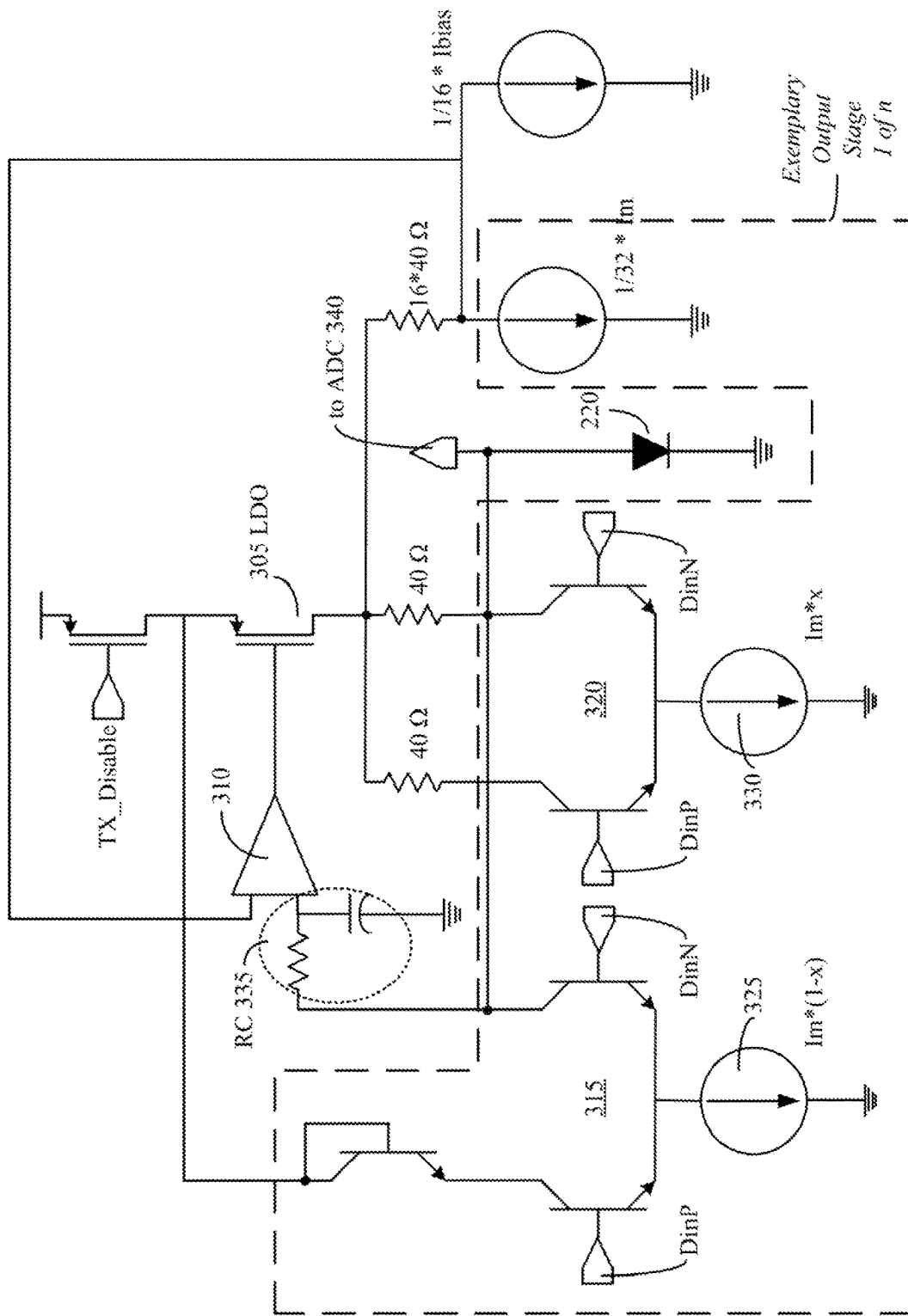
FIG. 3 shows a current feedback portion of the encoder/driver, in accordance with aspects of the present technology.

Referring now to FIG. 3, a current feedback portion of the encoder/driver, in accordance with aspects of the present technology, is shown. The circuitry within the dashed boundary represents a current source of a transmit layer, such as the main current source 270. The circuitry outside the dashed boundary represents a single current feedback loop. An exemplary PAM-4 encoder/driver can include nine current sources, including a pre current source 255, a main current source 270 and a post current source 285 for the top lane 210, the middle lane 212 and the bottom lane 214. The nine current sources can be coupled to a single current feedback loop.

Bias and modulation current levels are controlled by a feedback loop 300 comprising a low dropout (LDO) regulator 305 and an operational amplifier 310. Each output stage, for example nine in total, including the pre and post de-emphasis output stages, contribute a current proportional to the total desired modulation current in order to define the setpoint for the op-amp 310 controlling the LDO 305. For example, the current is 1/32 of the tail current for that particular stage. Thus, the modulation current setpoint is defined by a distributed architecture. Additional current for the bias is also summed in order to properly drive the LDO 305 output voltage such that the desired power level is achieved in the VCSEL 220. Due to the linear nature of the summing of output main, pre, and post de-emphasis current paths, current can be summed into a termination load. In one implementation, the termination load can be a 40 Ohms resistive element. The resistive value of the termination load can be selected to allow for sufficient headroom for a low dropout (LDO) regulator 225. In this manner, the range of modulation current settings, and a desirable high extinction ratio (ER), e.g., >6 dB, in the output optical signal may be achieved.

The VCSEL 220 can be biased with a current Ibias. In one implementation, the bias current Ibias can be 6 mA. An exemplary zero level in VCSEL 220, e.g., representing data of 00 binary can be 2 mA. An exemplary high level in VCSEL 220, e.g., representing data of 11 binary can be 10 mA. Thus, four current levels correspond to the four combinations of two bits. For example, 2 mA corresponds to a minimum output power of a VCSEL in operation, e.g., a data value of 00 binary.

Im is a "tail current" through the differential driver pairs 315 and 320, generated by current sources 325 and 330. A percentage "x" of the total Im is generated by current source 315, and the remainder of total Im is generated by current source 320. Undesirable voltage ripple on the LDO 225 output is minimized by Relation 1, below, based on the resistance of VCSEL 220, referred to as "Rvcsel."

$$x=Rvcsel/(Rvcsel+40) \quad \text{(Relation 1)}$$

The tail current Im, the total current for all exemplary nine stages combined, is based on the resistance of VCSEL, referred to as "Rvcsel," and the modulation current, Imod, which is equal to 48 mA (high level current minus level current), according to Relation 2, below:

$$Im=Imod*(Rvcsel+40)/40 \quad \text{(Relation 2)}$$

Note that the total Im will include contributions from up to the exemplary nine stages, and will not necessarily be equally distributed among the multiple stages. For example, a current contribution for any given stage may vary according to data and eye shaping requirements. The current sources 325, 330 can include differential data drivers, wherein "DinP" stands for Data In Positive, while "DinN" stands for Data In Negative.

Some current in every switching cycle bypasses LDO 305. If the total current passed through LDO 305, such total current would produce an undesirable ripple. Operational amplifier 310 controls the gate of LIX) 305 to generate the correct bias and modulation currents. The output current to VCSEL 220 goes through an RC low pass filter 335 as one input to op amp 310. The other input to op amp 310 is a current that is a ratio of the tail currents, which is a function of the bias current desired for the VCSEL plus the tail modulation. In some embodiments, some or all such current sources may be programmable.

As previously presented, it is necessary to know the resistance of VCSEL 220 in order to set bias and modulation currents so as to minimize ripple. See, for example, Relation 1, above. Unfortunately, the resistance of different VCSELs varies, and is frequently not well documented by the VCSEL manufacturer. In addition, a VCSEL is often selected and/or provided by a party other than the manufacturer of an integrated circuit device encoder/driver of FIG. 2 and/or current feedback loop of FIG. 3, and often selected after manufacture of such an integrated circuit.

In accordance with aspects of the present technology, the resistance of a VCSEL 220 may be determined in situ, for use in setting the tail currents of the differential driver pairs 315, 320.

In accordance with embodiments of the invention, the anode of VCSEL 220 is coupled to an analog to digital converter 340 (not shown). Two different currents are coupled through VCSEL 220. For example, a first calibration current of, for example, 4 mA, is coupled through VCSEL 220, and a first voltage measurement across VCSEL 220 is made via the analog to digital converter 340. A second calibration current of, for example, 6 mA, is coupled through VCSEL 220, and a second voltage measurement across VCSEL 220 is made via the analog to digital converter 340. From the two voltage measurements with known currents, a resistance of VCSEL 220 may be determined. In this novel manner, a resistance of a VCSEL does not need to be known by the party selecting and/or operating a VCSEL for use in a transmitter system.

Figure 4:
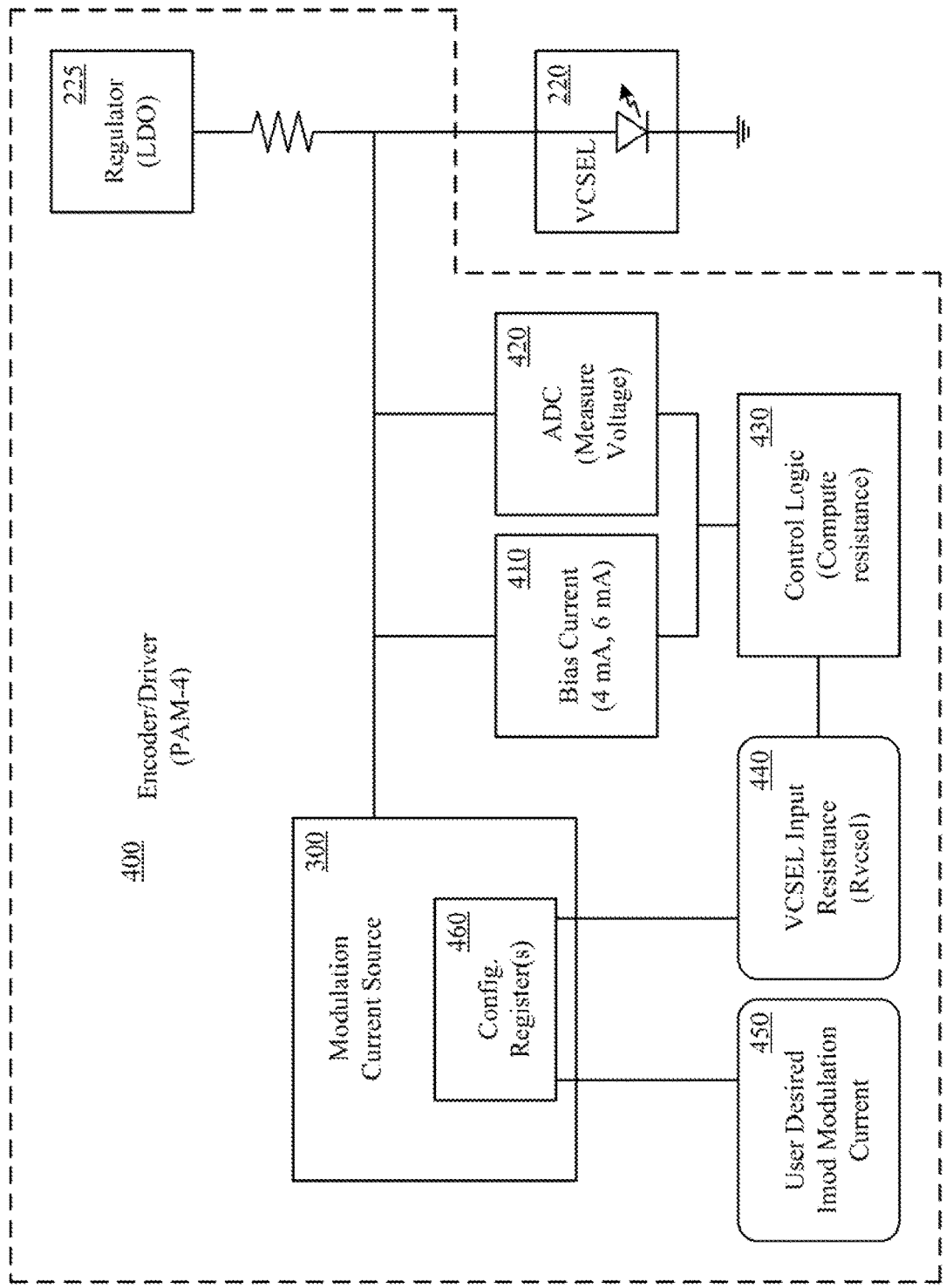
FIG. 4 shows an encoder/driver and optical transmitter, in accordance with aspects of the present technology.
Figure 5:
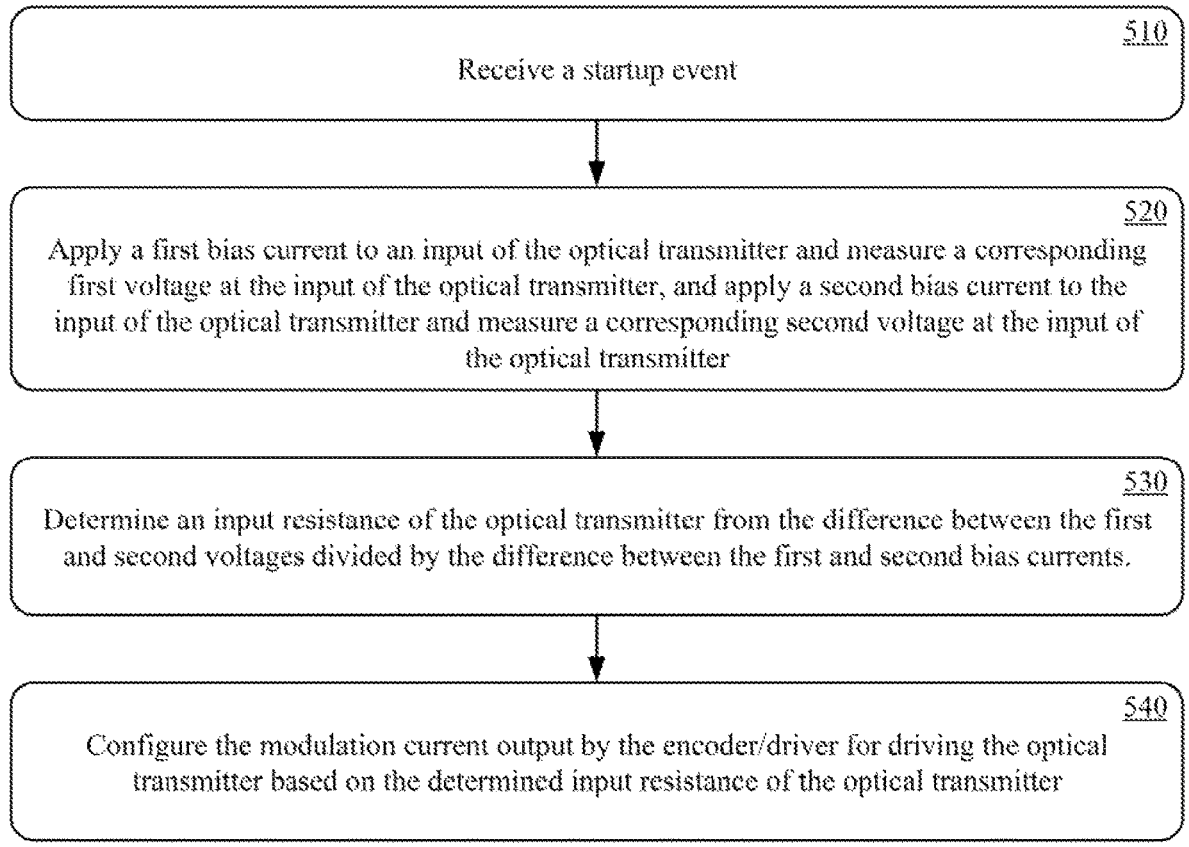
FIG. 5 shows a method of configuring an encoder/driver for an individual unit of an optical transmitter, in accordance with aspects of the present technology.

Referring now to FIG. 4, an encoder/driver and optical transmitter, in accordance with aspects of the present technology, is shown. The encoder/driver 400 can include a modulation current source 300 and a regulator 225, as described above. The encoder/driver 400 can further include a bias current generator 410, an analog-to-digital converter (ADC) 420, and control logic 430. The control logic 430 can be coupled to the bias current generator 410 and analog-to-digital converter (ADC) 420. In one implementation, bias current generator 410 and analog-to-digital converter (ADC) 420 can be coupled to the input of the optical transmitter 220 as illustrated in FIG. 4. In another implementation, the bias current generator 410 can be coupled to the input of the optical transmitter 220 through the regulator 225 (not shown). In one implementation, the control logic 430 and analog-to-digital converter (ADC) 420 can be implemented in a digital diagnostic monitoring information (DDMI) subsystem of the encoder/driver 400. In one implementation, the control logic 430 can be implemented as firmware by a microcontroller executing computing instructions stored in read only memory (ROM) of the encoder/driver 400. Alternatively, the control logic 430 could be implemented by a processing unit executing computing instructions stored in memory such as but not limited to random access memory (RAM), flash memory or the like. In yet another implementation, the control logic 430 could be implemented as a finite state machine (FSM). The bias current generator 410 and the analog-to-digital convert (ADC) 420 can be coupled to the output of the modulation current source 300. Operation of the encoder/driver 400 will be further explained with reference to FIG. 5, which shows a method of configuring an encoder/driver for an individual unit of an optical transmitter.

Figure 6:
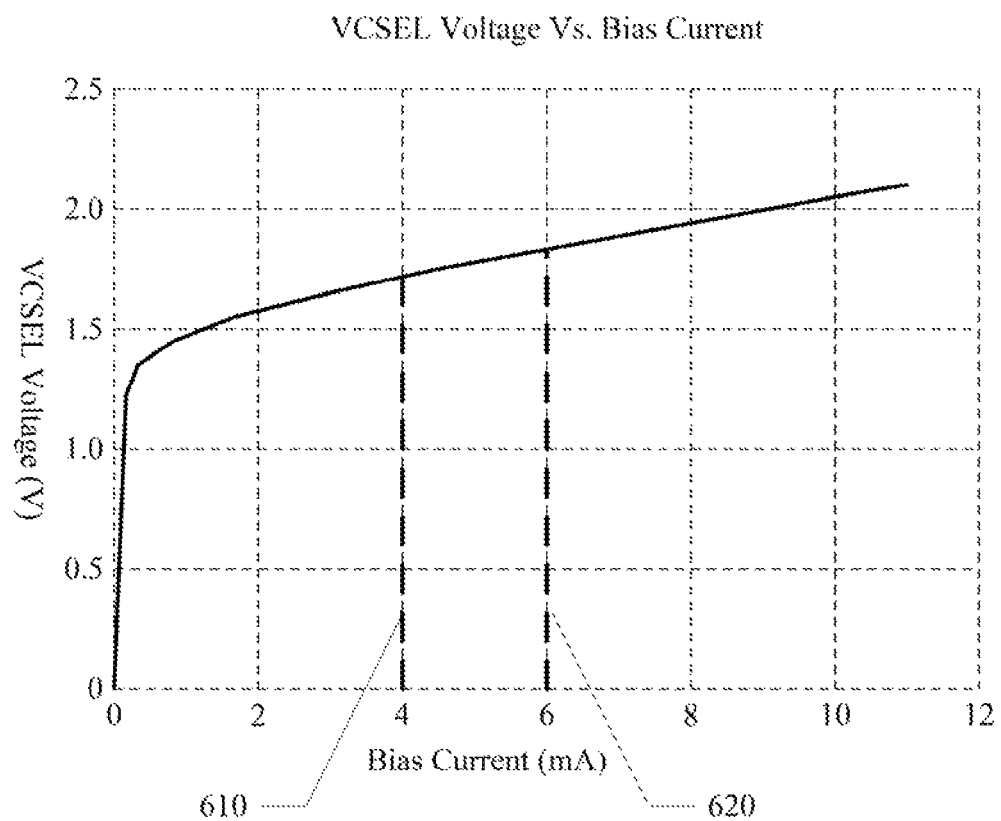
FIG. 6 shows a bias current versus input voltage of an exemplary vertical-cavity surface emitting laser, in accordance with aspects of the present technology.

The method of configuring the encoder/driver 400 can include receiving a startup event, at 510. In one implementation, the control logic 430 of the encoder/driver 400 can receive a startup event, such as but not limited to a power up signal or reset signal. At 520, a first bias current can be applied to an input of an optical transmitter and a corresponding first voltage can be measured at the input of the optical transmitter. In addition, a second bias current can be applied to the input of the optical transmitter and a corresponding second voltage can be measured. In one implementation, the control logic 430 can cause the bias current generator 410 to apply a first bias current to the input of the VCSEL transmitter 220 in response to the input event. The control logic 430 can cause the analog-to-digital converter 420 to measure the first voltage level at the input to the VCSEL transmitter 220 generated by application of the first bias current. The control logic 430 can then cause the bias current generator 410 to apply a second bias current to the input of the VCSEL transmitter 220 The control logic 430 can cause the ADC 420 to measure the second voltage level at the input to the VCSEL transmitter 200. For example, as illustrated in FIG. 6, the bias current generator 420 can apply a 4 milli Ampere (mA) current 610 to the input of the VCSEL with the high-speed data path turned off, and the ADC 420 can measure the resulting voltage. The bias current generator 420 can then apply 6 mA current 620 to the input of the VCSEL and the ADC 420 can measure the resulting voltage. In one implementation, the first and second bias currents can be chosen to be above the turn on threshold of the VCSEL, while at the time not being too high a current such that the input resistance of the VCSEL may become non-linear. The bias current can be trimmed at wafer probe during the manufacture of the encoder/driver 4) to a deviation of less then 1%. Furthermore, although the bias current may vary slightly from unit to unit of the encoder/driver 400, the difference between the first and second bias current levels will vary equally within each unit. Therefore, the use of the difference between the first and second bias currents in calculating the input resistance value will further increase the accuracy of the input resistance measurement.

At 530, an input resistance of the given individual unit of the optical transmitter can be determined from the difference between the first and second voltages divided by the difference between the first and second bias currents. In one implementation, the control logic 430 can calculate the input resistance of the particular optical transmitter 220 by dividing the difference between the measured second voltage and the measured first voltage by the difference between the second applied bias current and the first applied bias current. It is to be appreciated that the input resistance of the optical transmitter will vary to some extent from unit to unit due to manufacturing variances, operating conditions and or the like. Accordingly, the input resistance of the individual optical transmitter can be determined from the two different bias currents applied to the input of the given optical transmitter and the resulting two different voltages. At 540, the modulation current output by the encoder/driver 400 to drive the optical transmitter 220 can be configured based on the determined input resistance of the given individual unit. In one implementation, the control logic 430 can configure a modulation current of the modulation current source 300 based on the determined input resistance of the individual VCSEL 220 coupled to the encoder/driver 400. In one implementation, the modulation current can be determined in accordance with Relation 3.

$$Im\_set = Imod\_desired * (Rvcsel + 40)/40 \quad \text{(Relation 3)}$$

In one implementation, the modulation current can be configured on a per lane basis for all three non-return-to-zero lanes, top, mid and bottom in accordance with Relation 4.

$$Im\_set(\text{per lane}) = Imod\_desired * (Rvcsel + 40)/120 \quad \text{(Relation 4)}$$

It is to be appreciated that Im set can be utilized as Im in the current sources 325 and 330 as described above with reference to FIG. 3. The configured modulation current can be routed by the modulation current source 300 to the regulator 225 in order to reduce ripple voltage on the output of the regulator 225, thereby reducing vertical eye closure of the PAM-4 modulated signal to the VCSEL transmitter 220.

The determination of the input resistance of the VCSEL transmitter 220 utilized for configuration of the modulation current of the encoder/driver 400 can advantageously reduce ripple voltage from the regulator 225 of the encoder/driver 400, which can in turn minimize vertical eye closure of the encoder/driver output signal. The determination of the input resistance of the individual VCSEL transmitter 220 can also advantageously provide a measure of the health of the VCSEL transmitter 220 and variation relative to a mean, which can be a form of VCSEL process monitoring.

Figure 7:
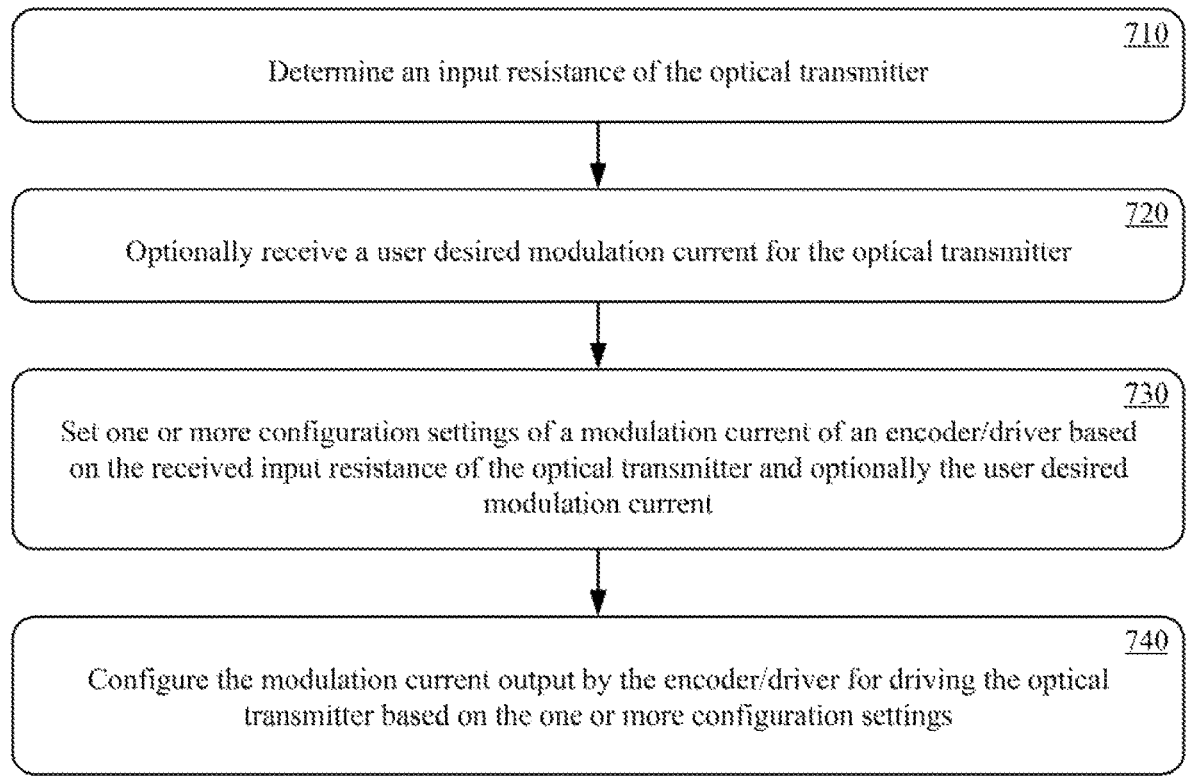
FIG. 7 shows a method of configuring an encoder/driver for an individual unit of an optical transmitter, in accordance with aspects of the present technology.

Referring now to FIG. 7, a method of configuring an encoder/driver for an individual unit of an optical transmitter, in accordance with aspects of the present technology is shown. The method can include determining an input resistance of the given individual optical transmitter unit coupled to an encoder/driver, at 710. In one implementation, the input resistance 440 of the particular optical transmitter 220 can be determined as described above with reference to FIGS. 4-6. At 720, a user desired modulation current for the optical transmitter can optionally be received. In one implementation, a desired modulation current 450 can be input by a user to the encoder/driver 400.

At 730, one or more configuration settings of a modulation current source of an encoder/driver can be set based on the received input resistance of the optical transmitter and optionally the user desired modulation current. In one implementation, one or more settings can be stored by the control logic 430 in one or more registers 460 that control the modulation current generated by modulation current source 300. At 740, the modulation current output by the encoder/driver for driving the optical transmitter can be configured based on the one or more configuration settings. In one implementation, the modulation current source 300 can generate one or more modulation currents of the sum thereof for output to the optical transmitter 220 based on the state of the one or more registers 460.

In contrast, in the conventional encoder/driver, the user (e.g., customer) had to know the VCSEL input resistance from the component manufacturer's datasheet for the VCSEL. The user then needed to calculate the required modulation current register values off-chip for a desired modulation current. Four different registers needed to be set by the user on the PAM-4 encoder/driver chip with the user calculated modulation current register values. The conventional process incurred data write time across a data interface such as inter-integrated circuit (I2C) communication link. The conventional process is also prone to errors by the user.

Aspects of the present technology advantageously simplify the setting of the registers related to the modulation current for the VCSEL. The conventional process of off-chip calculations based on the VCSEL input resistance from the manufacturer datasheet is advantageously eliminated. The input resistance of the individual VCSEL can be advantageously automatically determined by the encoder/driver in accordance with aspects of the present technology. The encoder/driver can also advantageously automatically calculate the desired modulation current from the on-chip measured VCSEL input resistance and optionally a user specified desired modulation current. Furthermore, the corresponding register values can be automatically set based on the desired modulation current. Accordingly, aspects of the present technology advantageously provide for configuration of the modulation current based on the individual optical transmitter. Aspects also advantageously reduce the setup time for configuring the modulation current of the encoder/driver. Aspects also advantageously reduce user error in the configuration of the modulation current of the encoder/driver. Aspects of the present technology therefore can reduce the workload for the user and improve ease of use.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A driver comprising:
a bias current generator;
an analog-to-digital converter; and
control logic configured to:
control the bias current generator to apply a first bias current to an input of an optical transmitter and control the analog-to-digital converter to measure a corresponding first voltage at the input of the optical transmitter;
control the bias current generator to apply a second bias current to the input of the optical transmitter and control the analog-to-digital converter to measure a corresponding second voltage at the input of the optical transmitter; and
determine an input resistance of the optical transmitter from a difference between the second and first voltages divided by a difference between the second and first bias currents.

2. The driver according to claim 1, wherein the control logic is configured to control the bias current generator and analog-to-digital converter and determine the input resistance in response to a detected startup event.

3. The driver according to claim 1, wherein the first bias current and the second bias current are above a turn on threshold of the optical transmitter.

4. The driver according to claim 3, wherein the first bias current and the second bias current are below a level where the input resistance of the optical transmitter is non-linear.

5. The driver according to claim 1, wherein the optical transmitter comprises a vertical-cavity surface emitting laser.

6. The driver according to claim 1, wherein the driver is incorporated in a four-amplitude level of pulse modulation encoder/driver.

7. The driver according to claim 1, further comprising:
a modulation current source;
wherein the control logic is further configured to:
set one or more configuration settings of the modulation current source based on the determined input resistance of the optical transmitter.

8. The driver according to claim 7, wherein the modulation current source is configured to output a modulation current to the optical transmitter based on the one or more configuration settings.

9. The driver according to claim 1, wherein the control logic is further configured to:
receive a user desired modulation current; and
set one or more configuration settings of the modulation current source based on the determined input resistance of the optical transmitter and the received user desired modulation current.

10. The driver according to claim 9, wherein the modulation current source is configured to output a modulation current to the optical transmitter based on the one or more configuration settings.

11. A method of configuring an encoder/driver comprising:
receiving a startup event;

applying a first bias current to an input of the optical transmitter and measuring a corresponding first voltage at the input of the optical transmitter in response to the received startup event, wherein the first bias current is above a turn on threshold of the optical transmitter;

applying a second bias current to the input of the optical transmitter and measuring a corresponding second voltage at the input of the optical transmitter in response to the received startup event, wherein the second bias current is above a turn on threshold of the optical transmitter; and determining an input resistance of the optical transmitter from the difference between the first and second voltages divided by the difference between the first and second bias currents in response to the received startup event.

12. The method of claim 11, further comprising:

configuring a modulation current output by the encoder/driver for driving the optical transmitter based on the determined input resistance of the optical transmitter.

13. The method of claim 11, further comprising:

setting one or more configuration settings of a modulation current source of an encoder/driver based on the determined input resistance of the optical transmitter in response to the received startup event.

14. The method of claim 11, further comprising:

receiving a user desired modulation current for the optical transmitter; and setting one or more configuration settings of a modulation current of an encoder/driver based on the determined input resistance of the optical transmitter and the user desired modulation current in response to the received startup event.

15. The method of claim 11, wherein the encoder/driver comprises a four-amplitude level of pulse modulation encoder/driver.

16. The method of claim 11, wherein the optical transmitter comprises a vertical-cavity surface-emitting laser.

* * * * *

UNITED STATES PATENT AND TRADEMARK OFFICE
CERTIFICATE OF CORRECTION

PATENT NO. : 11,411,653 B2  
APPLICATION NO. : 17/124430  
DATED : August 9, 2022  
INVENTOR(S) : Eric Iozef and George L. Barrier, IV Page 1 of 1

It is certified that error appears in the above-identified patent and that said Letters Patent is hereby corrected as shown below:

On the Title Page

Item (12) delete "Lozsef" and insert --Iozsef--

Item (72), list the Inventor as follows:
(72) Inventors: Eric Iozsef, Toronto (CA); George L. Barrier, IV, Aliso-Viejo CA (US)

Signed and Sealed this  
Third Day of September, 2024

Katherine Kelly Vidal  
*Director of the United States Patent and Trademark Office*